(12) United States Patent
Scipioni

(10) Patent No.: US 9,547,786 B2
(45) Date of Patent: Jan. 17, 2017

(54) CODELESS QR CODE

(71) Applicant: PAYPAL, INC., San Jose, CA (US)

(72) Inventor: German Scipioni, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/207,366

(22) Filed: Jul. 11, 2016

(65) Prior Publication Data

US 2016/0321489 A1 Nov. 3, 2016

Related U.S. Application Data

(63) Continuation of application No. 14/961,759, filed on Dec. 7, 2015, now Pat. No. 9,390,305, which is a continuation of application No. 13/595,128, filed on Aug. 27, 2012, now Pat. No. 9,208,397.

(51) Int. Cl.
*G06K 9/46* (2006.01)
*G06K 7/14* (2006.01)
*G06K 7/10* (2006.01)

(52) U.S. Cl.
CPC ......... *G06K 7/1443* (2013.01); *G06K 7/10722* (2013.01); *G06K 7/1417* (2013.01)

(58) Field of Classification Search
CPC .... G06K 19/06; G06K 7/1417; G06K 7/1443; G06K 9/46; G06Q 20/00; G06Q 20/3274; G06Q 20/3276; G06T 1/0021; H04W 4/02

USPC .......................................................... 382/192
See application file for complete search history.

(56) References Cited

U.S. PATENT DOCUMENTS

| 7,685,522 B1 * | 3/2010 | Feuerman | G06F 17/243 715/202 |
| 2013/0228630 A1 * | 9/2013 | Fan | G06K 19/06103 235/494 |
| 2013/0262315 A1 * | 10/2013 | Hruska | G06Q 20/227 705/67 |

* cited by examiner

*Primary Examiner* — Manuchehr Rahmjoo
(74) *Attorney, Agent, or Firm* — Haynes and Boone, LLP

(57) ABSTRACT

A service provider receives, from a user, picture information captured by a user device from a picture mark associated with a product or service of a merchant. It determines a matching picture image by comparing the picture information with picture images in a server, previously registered by the merchant. It also determines, out of attributes previously registered by the merchant, a matching attribute set uniquely associated with the matching picture image. The attributes may be web links, mobile APPs, or any media files that the merchant desires to communicate to users about its products or services. The service provider then communicates to the user the matching attribute set to be loaded on the user device and direct the user to the web links, mobile APPs, or media files that the merchant predetermined.

16 Claims, 4 Drawing Sheets

CODELESS QR CODE

CROSS REFERENCE TO RELATED APPLICATIONS

This application is a continuation of U.S. patent application Ser. No. 14/961,759, filed Dec. 7, 2015, which is a continuation of U.S. patent application Ser. No. 13/595,128, filed Aug. 27, 2012, now issued as U.S. Pat. No. 9,208,397, all of which are hereby incorporated by reference in their entirety.

BACKGROUND

Field of the Invention

The present invention generally relates to two-dimensional codes and more particularly to codes captured on computing devices.

Related Art

QR Code (abbreviated from Quick Response Code) is the trademark for a type of matrix barcode (or two-dimensional code) first designed for the automotive industry. More recently, QR codes have become popular outside the industry due to its fast readability and large storage capacity compared to standard UPC barcodes. A QR code consists of black modules (square dots) arranged in a square pattern on a white background and is detected as a 2-dimensional digital image by a semiconductor image sensor and is then digitally analyzed by a programmed processor.

QR codes have in recent years become common in consumer advertising and packaging, due to wide dissemination of smart phones having a barcode reader or a scanner. As a result, the QR code has become a focus of advertising strategy, since it provides quick and effortless access to the brand's website, item, or service.

Despite all the popularity and success QR codes have been enjoying these days, one disadvantage or shortcoming is their unattractive appearance. Except for some consumers who might see a geometrical beauty in them, to most consumers the monotonous, all look-alike two dimensional array of black dots in QR codes is simply a turn-off and non-inspiring as they convey no impression, memory, or association with the product or service they are used with.

Therefore, a need exists to provide merchants a system or way, as a substitute for conventional QR codes, to communicate to consumers the same kind of information or benefits as the QR codes do, with a more pleasing or personalized appearance of such a code.

DETAILED DESCRIPTION

Figure 1:
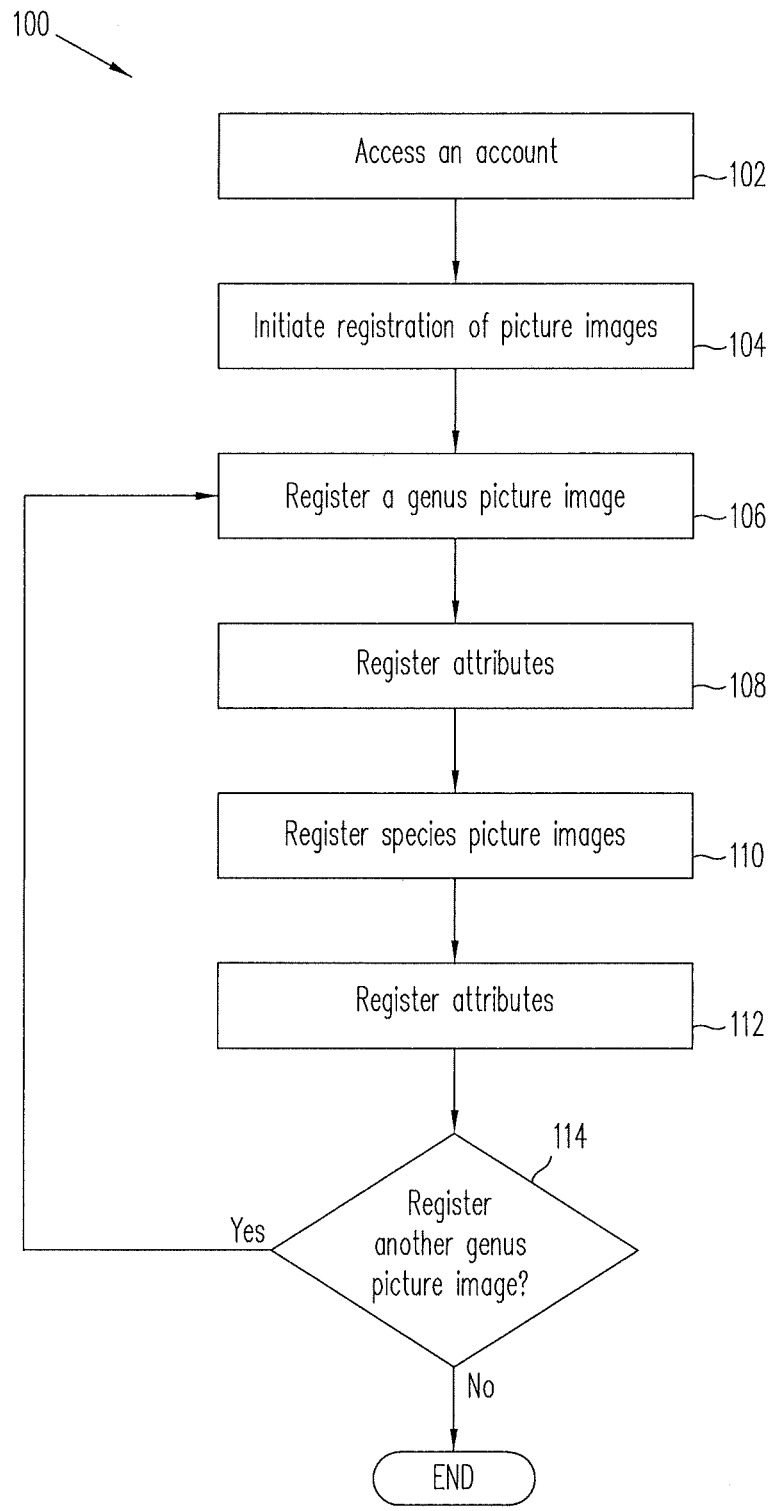
FIG. 1 is a flowchart showing a process a merchant performs in registering/modifying picture images and associated attributes in an account with a service or payment provider, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

In one embodiment, a picture mark in the present disclosure is a picture or image associated with a particular product or service of a merchant, to be shown to consumers. The merchant could be a manufacturer, distributor, retailer, or service provider. In a physical store, the picture mark may be directly printed on an outer surface of a shelved product, or printed on a paper or plastic label which may be in turn attached to the product, or otherwise displayed close to the product, such as at an adjacent shelf or catalogue hanging. In an online site of a merchant, the picture mark may be next to a picture or description of particular product or service on a screen of a computer or mobile device. The picture marks in different embodiments provide similar functions that QR codes do in the current market, but have several advantages over them.

QR codes consist of square dots arranged in a square pattern on a white background to form a two dimensional geometrical design. As with common one dimensional bar codes, they are not connected to any images of real things found in life, and thus, aesthetically not very attractive to most consumers. But picture marks described herein, whether drawn or photographed, depict images that people commonly see, find, or are familiar with in their everyday lives, such as cars, furniture, people, plants, animals, houses, machines, and etc. An ordinary person seeing the picture mark can readily recognize or identify what the picture or image is representing, depicting, meaning, or referring to. In some cases, the picture or image may be identical or similar to the logos, emblems, or other graphic marks the merchants already have been using for their products or services. Unlike the common QR codes, the picture marks are aesthetically attractive and may convey meanings or impressions to the consumers as the merchants wish. The picture marks may appear in magazines, on signs, on buses, on business cards, or on almost any object about which users might need information, as well as shown on electronic media.

In QR codes, information is coded according to well known standards. So QR codes can be captured or scanned by scanners on the mobile devices, and the may be readily decoded by various kinds of commercially available local applications in the mobile devices. Once decoded, QR codes may directly link consumers on their user devices to particular websites of merchants for advertisement, promotion, or sales purposes. Or they may be encoded with any information that merchants want to communicate to consumers, subject to a limitation in size and capacity of a given QR code, which may be conveyed on the user devices in the form of texts, images, sounds, or clips.

Unlike QR codes, the picture marks are not coded in itself in such a way as to be decoded by a standalone application in the user device. With the help of a service or payment provider, such as PayPal, Inc. of San Jose, Calif., the picture marks can perform almost exactly the same or similar functions as the current QR codes. For that, a merchant who has an account with the payment provider may register picture images corresponding to respective picture marks with the service or payment provider in advance. The merchant, the registrant, may be the author of a picture mark who may be either the manufacturer of the product or service that the particular picture mark is associated with, or the retail seller or distributor of the product or service. The picture images to be registered are basically the same as the pictures or images the consumers actually sees on the picture marks displayed on each product and service except that the picture marks may have small additions to the registered picture images in the form of marks, labels, logos, icons, or the like, to convey to the payment provider the identity of the registrant or other information.

Using the registered picture images, the payment provider may be able to link the consumers, who scan and transmit specific picture images to a payment provider, to various information that the registrant of the picture images wishes to convey. More specifically, such linkage is implemented by associating various attributes, registered together with the picture images by the merchant, with each picture image. The attributes may include any channels or mediums of information that the merchant desires to convey to potential consumers. In one embodiment, the attributes may be website links bringing the users to a site of a manufacturer, distributor, or retailer immediately on their user devices, where more information may be conveyed to the consumer. The webpage may be developed by the manufacturer, distributor, or retailer for the purpose of advertising, promoting, or selling particular products or services that specific picture marks are attached to. The page may contain the merchant's discounted items and other incentives. The webpage may be for the purpose of providing the consumers with information on any related products or services from the same merchant, or, it could be a webpage inviting consumers to open an account with the merchant.

In one embodiment, the users may be directed to different web sites depending on the current location of the users. Using the GPS function most mobile devices carry these days, the location information of users may be transmitted to a payment provider together with specific scanned picture images of a product or service. The registrant of the picture images and attributes, whether it is the manufacturer or retailer, may wish to associate a given picture image with multiple different websites depending on where the user is. For instance, if the user who transmits the picture images is in LA, the registrant may wish to direct the user to a web site specifically developed for locals living in LA, and if the user is in New York, then to another web site for New Yorkers. For that purpose, at the time of registration of picture images and attributes, the registrant may associate, or give instructions to a service provider to do so, different attributes (web links) with a same particular picture image for communication to users, depending on where the picture images is transmitted from.

In another embodiment, the attributes associated with the particular picture image may be mobile APPs or html5 APPs, which would be automatically loaded and run on the user device. In still another embodiment, the attributes may be alpha-numeric text data, pictures, moving clips or any other media files containing messages or images related with the products or services, which would be automatically displayed or played on the user's device via an application thereon.

Depending on the attributes, the registered picture images may be categorized into two types of images, a 'genus' picture images and a 'species' picture images. The genus picture images are those associated with a common line or similar kinds of products. A species picture image is a minor variant of a genus picture image, created by slightly modifying a portion or a feature in the genus picture image or adding a minor feature to it. The modification may be minor such that consumers may still recognize the modified image as related to the general line of a product or service represented by the genus picture image, but may create distinction to enable the payment provider server to distinguish it from the genus picture image and other species of the same genus so as to associate a correct attribute(s) (web links, mobile APPs, messages, etc.) to it.

In general, a species picture image is registered for conveying additional information to that of the 'genus' picture image, and thereby, may replicate the function of QR codes in conveying various information to consumers. For example, for a particular kind of product or service line, there may be several products of different grades or prices. There may be variants or related products or services, and the merchant may wish to convey to consumers different messages, or direct them to different web links for different variants of the product or service. In this case, the merchant need not design totally new picture marks and accordingly register totally new picture images for each variant to do so. Instead, the merchant may design slightly modified versions of the genus picture mark associated with the general product line and register them as species picture images with the payment provider.

Another example may be when there is a special promotion or sale for a limited period of time for a specific product or service. The merchant may wish to communicate to consumers special sale prices, printable coupons, or other promotion offers during that limited time. Again, the merchant need not design a totally new picture mark and accordingly register a totally new picture image to convey such special, but temporary information to consumers. Instead, the merchant may design a modified version of a picture mark to be attached to the product or service for the promotion time, and register a corresponding picture image with the payment provider as a species image, together with the desired special information. The merchant may have the new information either replace the original message or web link associated with the genus picture image, or be additionally displayed on the user's device, for instance, via another pop up window.

FIG. 1 is a flowchart showing a process 100 a merchant, who may be a manufacturer, distributor, or retailor, performs in registering/modifying picture images and associated attributes in an account with a service or payment provider, according to one embodiment. At step 102, a merchant accesses an account through a merchant device, such as a server, PC, tablet, or other suitable device. Accessing the account may include entering any requested identification and/or authentication information, such as a user name, email address, name, phone number, password, PIN, pass code, etc., onto a field via a device keyboard or keypad, or speaking the identifier into a device microphone. Once the merchant has been authenticated, the merchant may be directed to a home page of the payment provider or a merchant account. On the page, there may be an option to register or modify picture images of the merchant. The option may be presented as a tab, button, or link, which the merchant may tap or click on, at step 104, through a touch screen or mouse of the merchant device to initiate the registration or modification of picture images by the process 100.

At step 106, the merchant may see, on the screen of the merchant device, another tab, button, or link to register picture images of the merchant. The picture images to be registered may be in any publicly used image format such as jpeg, jpg, gif, tiff, png, bmp, ps, or pdf. Tapping or clicking on the tab, button, or link may pop up a window that may request the merchant to upload, first, a genus picture image by browsing through the merchant device.

Once a genus picture image to register is selected by clicking on the particular picture image file name, another window may be popped up, at step 108, for the merchant to enter, in one embodiment, an internet link or website URL to be associated with the selected genus picture image. In another embodiment, at the same step 108, the pop up window may provide a list of mobile APPs or html5 APPs for the merchant to choose to be loaded and run on the user device. In still another embodiment, at the same step 108, the merchant may be given a choice to associate the genus picture image with any media files in texts, pictures, moving clips, or any other format that can be automatically displayed or played on the user's device through a user application. The media files may deliver any information related with the product or service. The merchant may upload the media files from the merchant device in the same manner with uploading the picture image files.

At the next step 110, the merchant may be asked whether to register any species picture image that might have been designed for delivering various special or extra information to consumers. Once registering a species picture image, if any, then at step 112, the merchant may enter, just as in step 108, any attribute(s) to be associated with it such as special messages, media, or web links. In this stage, the merchant may be given an option, in one embodiment, to have the newly entered attribute either override, or simply added to, the attribute(s) associated with the genus picture image. In the former case, only the newly entered attributes (web links, APPs, media files) will be loaded on the user device when a consumer transmits to the payment provider the modified picture mark, but in the latter, two attributes may be loaded on the user device consecutively, for example, through a window being popped upon a base website.

In an embodiment, at step 108, the merchant may be given an option to enter different website URLs, mobile APPs or html5 APPs, or media files for a given genus or species picture image, depending on predetermined list of locations. In this case, when finishing registering multiple attributes for each genus or species picture image, the merchant may be asked whether to make the registered attributes location-specific such that when a genus or species picture image is transmitted from a particular location, the user may be directed to an attribute(s) assigned to, or made specific to, that particular location.

When having finished registering all species picture images and related attributes, the merchant be asked at step 114, whether to register another genus picture image for a different line of product or service. When the merchant wishes to do so, it may repeat the steps from 106 to 112. For any reason, if the merchant wishes to use a totally different genus picture image for a product or service that is related to or a variant of, the same line of products/services, the merchant may do so still by registering it as another genus picture image at step 106, not as a species at step 110.

At each step, the merchant can view the information entered or uploaded, and when no more information is to be added, the user is notified to confirm or modify, if desired, any information or uploaded material. All the picture images and attributes registered are stored, together with the merchant identifier, in the server of either the service provider, and associated with the merchant account. The merchant may add, modify, or delete the registered picture images and the associated attributes any time after the initial set up by accessing the merchant's account and repeating the process 100 described herein. Note that one or more of the steps in any process described herein can be combined with one or more steps, omitted, and/or performed in a different sequence. After finishing the process, the entered data of the merchant are stored or associated with the merchant account on the payment provider.

Figure 2:
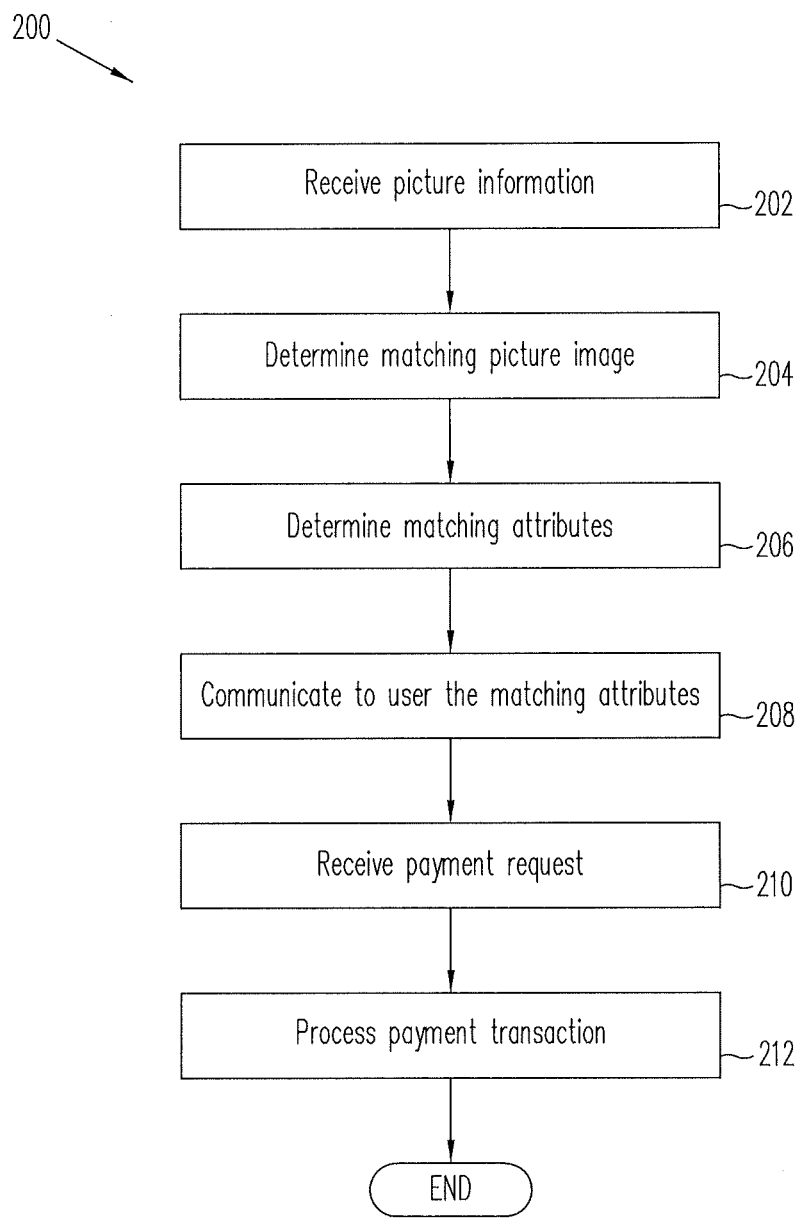
FIG. 2 is a flowchart showing a process a service or payment provider performs in receiving from a user picture information for a particular product or service of a merchant, captured from an associated picture mark, and linking the user to merchant's preset internet links, mobile APPs, or other information, according to one embodiment.

FIG. 2 is a flowchart showing a process 200 a service or payment provider, such as PayPal, Inc. of San Jose, Calif., performs in receiving from a user picture information for a particular product or service of a merchant, captured from a picture mark associated thereto, and linking the user to merchant's preregistered internet links, mobile APPs, or other media, according to one embodiment. For the user to process payment transactions through the payment provider, both the user and the merchant may have their own respective accounts with the payment provider.

At step 202, the payment provider receives picture information for a particular product or service from a user through a user application on a user device. The user device may be any device that has a capability of wireless communication, a scanner such as Zxing or any other suitable one, and an application that can read and transmit the scanned data to the payment provider. In another embodiment, a camera may perform the same job as the scanner when the payment provider has a proper application to process the transmitted photo images. Examples of the user devices with such functions may include, but are not limited to, a PC, a mobile phone, a tablet, iPad, etc.

The user application may be developed either by the payment provider or by a third party. The picture information is, first, scanned from a picture mark that may be attached to a product in a merchant's physical store, displayed next to a product's photo or a service description in the catalogue, newspaper or magazine, or shown on a merchant's web page next to its products or services. Next the picture information is wirelessly transmitted from the user device to the payment provider through the user application. The picture information may include, in one embodiment, not only the digital data of a particular picture image registered with the payment provider by a merchant, but an identifier of the merchant who is the author of or associated with the picture mark on its product or service. If the identifier of the merchant is included in the picture information, the payment provider may more readily locate and access the merchant's account. However, even if the identifier of the merchant is not included, the payment provider still may be able to identify the merchant by searching its server for a matching picture image out of a plurality of picture images registered by multiple merchants.

In one embodiment, when receiving the picture information at step 202, the payment provider may further receive location information of the user from the user device. The location information may be obtained independently from GPS function installed in the user device and automatically transmitted to the service provider together with the picture information.

Once receiving the picture information, then at step 204, the payment provider may determine which registered picture image the picture information corresponds to. The payment provider has in the memory of its server a plurality of picture images registered by multiple merchants. The payment provider may derive a picture image out of the digital data of picture information it received, and then search its memory for a particular picture image that may match the derived picture image.

If the picture information contains a merchant identifier, the search would be faster since the server may have to search only within the account information of the identified merchant. But the payment provider may still find a matching picture image even without the merchant identifier.

At step 206, the payment provider may further determine what attribute or attributes are associated with the matching picture image determined. The registered attributes may include internet or web links, mobile APPs, html5 APPs, or any media files in texts, pictures, moving clips, or any other known format that can be automatically displayed or played on the user's device through a user application. In one embodiment, at the time of registration by a registrant, each of the registered picture images may have been uniquely associated to at least one attributes from the registered attributes. In this case, the service provider may quickly be able to locate, and determine, matching attribute(s) associated with the matching picture image found at step 204. In another embodiment, when location information of the user has been received by the payment provider together with the picture information at step 202, the payment provider may locate and determine matching attribute(s), not only associated with the matching picture image found at step 204, but also specific to the location obtained from the location information. Such association of attributes for a given picture image to respective specific locations may have been done at step 108 of the process 100.

Once the set of attributes that is associated with the matching picture image is determined, the payment provider may communicate, at step 208 to the user the matching attributes. As described hereinbefore, in one embodiment the matching attributes, such as web links, may be different for users living in different locations even the associated picture image is the same for all the locations. The attributes may be loaded on the user device via the user application installed therein. If the attribute is a web link, the user application may open the link or connect to a wireless network on the user device. If the attribute is a mobile APP or html5 APP, the user application may launch the APP on the user device. If the attribute is a media file, such as sound or clip, or even text messages, the user application may play or display text, contact information via either the user application or another appropriate application in the user device.

In one embodiment, the payment provider may receive, at step 210, a payment request from the user, if the user has an account with the payment provider, to process payment for item(s) the user found in the web link that automatically loaded on the user device by the communication of an attribute from the payment provider. In one embodiment, the payment request may be sent from the user device by the user selecting, for instance, a "Purchase" or "Buy" tab or button on the user application. If not already authenticated or logged in, the user may be asked to enter certain information, such as a user name, an email address, and/or a password/PIN. If partially authenticated, the user may only need to enter a password/PIN. Receiving the payment request together with the user's account information, the payment provider may be able to process the payment immediately, with the knowledge of the identity of the merchant obtained from the merchant's account information when it communicated to the user the matching attribute set.

In another embodiment, the payment request may be transmitted to the payment provider directly from the merchant server at the user's request. When the user selects the "Purchase" or "Buy" tab or button, or even says "Pay" on a merchant's website viewed from the user device, the merchant server may obtain the user's information from the user application that the user is logged on, and make a payment request to the payment provider for the items the user chose at the merchant's website.

At step 212, the payment provider processes payment transaction for the item(s).

Figure 3:
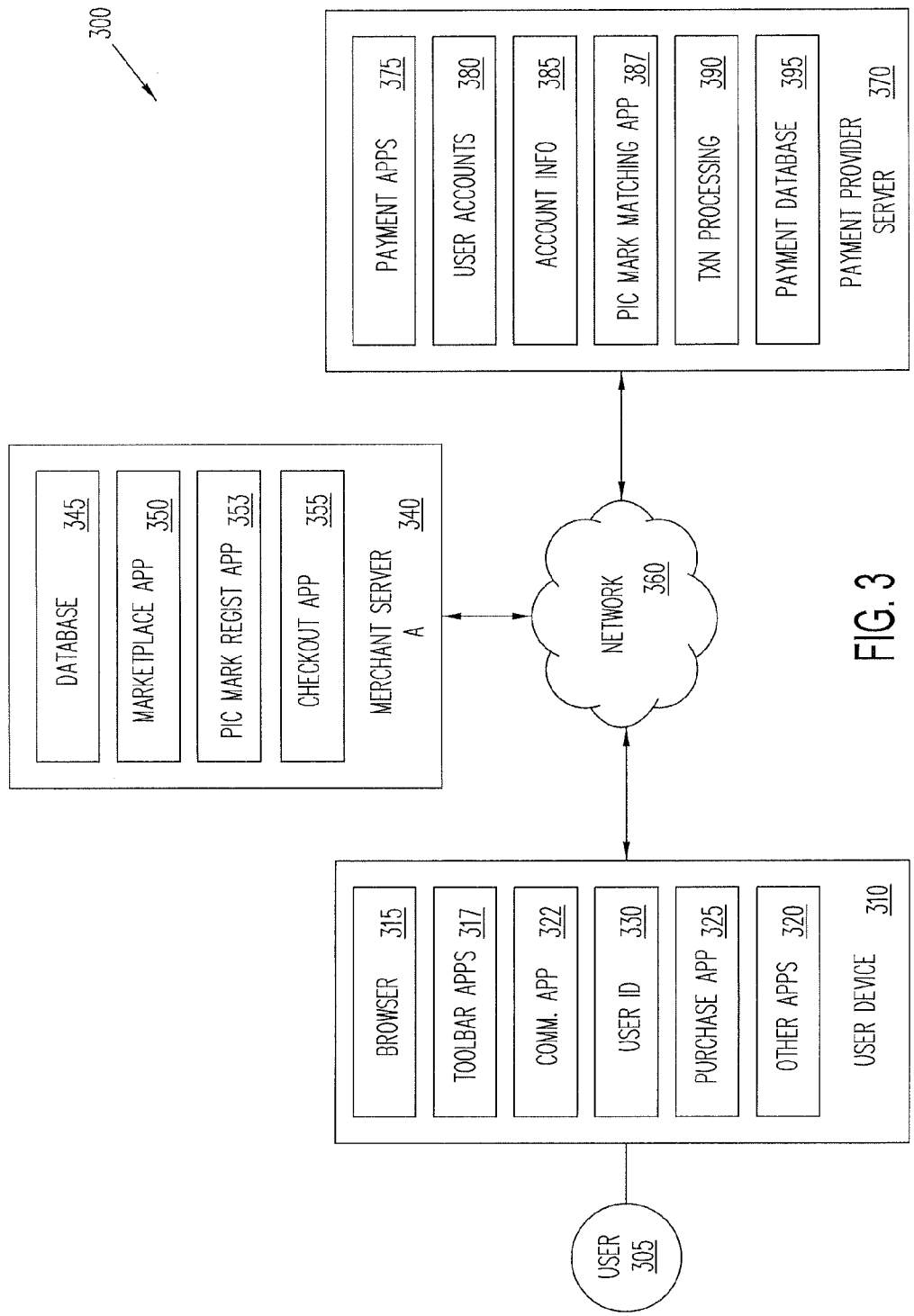
FIG. 3 is block diagram of a networked system suitable for implementing the process described herein according to an embodiment.

FIG. 3 is a block diagram of a networked system 300 configured to handle a transaction, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a buyer or consumer, utilizes user device 310 to perform a purchase transaction using payment provider server 370. Note that transaction, as used herein, refers to any suitable action performed using the user device, including payments, transfer of information, display of information, etc. Although only one merchant server is shown, a plurality of merchant servers may be utilized if the user is purchasing commercial items from multiple merchants.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, tablet, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, and/or access merchant sites for viewing and purchasing commercial products. User device 310 may also include one or more toolbar applications 317 which may be used, for example, to provide client-side processing for performing desired tasks in response to operations selected by user 305. In one embodiment, toolbar application 317 may display a user interface in connection with browser application 315 as further described herein.

User device 310 may further include a purchase application 325 by which the user 305 may transmit a purchase request to the payment provider server 370. The purchase application 325 may be incorporated into the browser 315 in one embodiment such that it may enable the user 305 directly making a purchase request from a merchant's website loaded via the browser 315. Further, the purchase application 325 may have a scanning function to scan, through a scanner in the user device 310, a picture mark of a product or service, either at a physical store or on a merchant's online shopping site, to obtain picture information, and transmit it to the payment provider server 370 via network 360.

User device 310 may further include other applications 320 as may be desired in particular embodiments to provide desired features to user device 310. For example, other applications 320 may include security applications for implementing client-side security features, programmatic client applications for interfacing with appropriate application programming interfaces (APIs) over network 360, or other types of applications. Applications 320 may also include email, texting, voice and IM applications that allow user 305 to send and receive emails, calls, and texts through network 360, as well as applications that enable the user 305 to communicate, transfer information, and make payments. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. For example, a purchased item may be a donation to charity in the name of the user 305. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Further, the merchant server 340 may further include a picture mark registration application 353, which may be either incorporated into the marketplace application 350 or separate but linked with the marketplace application 350, for the purpose of providing the service of transmitting a request, with other necessary data to the payment provider, to register picture images and various attributes to be associated therewith in connection with picture marks on the products and services of the merchant. The application 353 is connected to database 345 to upload picture images and attributes stored therein.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360. For example, checkout application 355 may receive and process a payment confirmation from payment service provider server 370, as well as transmit transaction information to the payment provider and receive information from the payment provider (e.g., a transaction ID).

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user or merchant accounts 380, each of which may include account information 385 associated with individual users, including funders' profile created by the user 305. For example, account information 385 may include private financial information of users of devices such as account numbers, passwords, device identifiers, user names, phone numbers, credit card information, bank information, or other financial information, and shipping information which may be used to facilitate online transactions by user 305. Account information, especially of a merchant, may also include an identifier of the merchant, one or more picture images, and one or more attributes registered by the merchant. Advantageously, payment application 375 may be configured to interact with merchant server 340 on behalf of user 305 during a transaction with checkout application 355 to track and manage purchases made by users and which funding sources are used, as well as incentives for a user.

Payment provider server 370 may further include a picture mark matching application 387, which is associated with the user's account information 385. The picture mark matching application 387 receives from the user 305, via the purchase application 325, picture information scanned from the user device 310, determines a matching picture image by comparing the picture information with the registered picture images stored in a data base 395, determine a matching attribute set uniquely associated with the matching picture image, and communicate to the user device 310 the matching attribute set to be loaded on the user device 310.

The transaction processing application 390, which may be part of payment application 375 or separate, may be configured to receive a purchase request from a user device 310 and/or merchant server 340 for processing payment and storing the transaction in a payment database 395. In an embodiment, such purchase request may come to the transaction processing application 390 through via the purchase application 325 in the user's device 310. The transaction processing application 390 may include one or more applications to process information from user 305 for processing an order and payment using various selected funding instruments as described herein. As such, transaction processing application 390 may store details of an order associated with a phrase from individual users.

Figure 4:
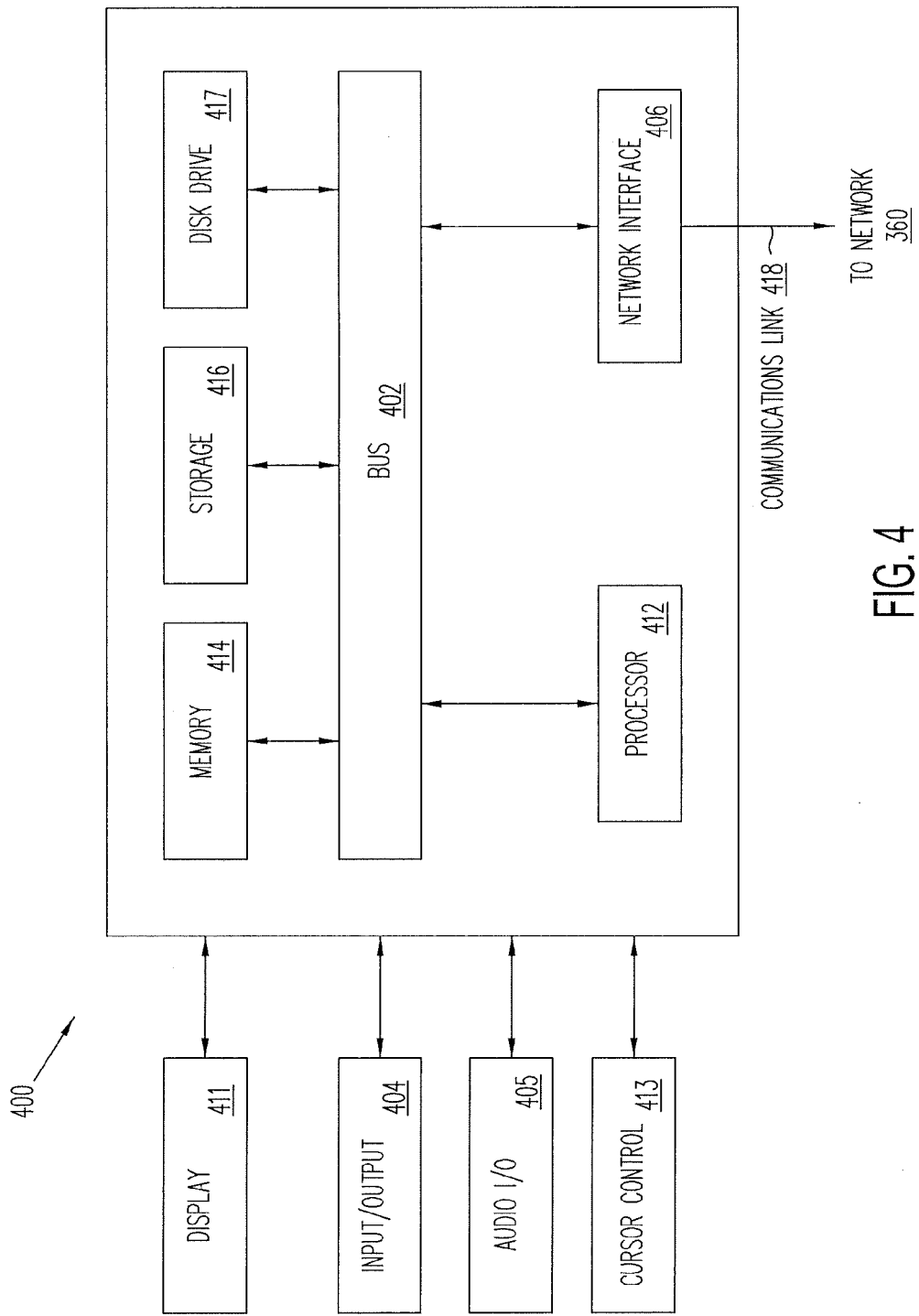
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 613 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving an image captured by a user device using a camera of the user device, wherein the image includes a picture mark displayed on an item, wherein a general picture mark corresponds to a plurality of items including the item, and wherein the picture mark for the item is generated specifically for the item for a limited time by modifying the general picture mark;
   determining a location of the user using the user device;
   determining data associated with the item from the picture mark and the location, wherein the determining the data is performed without decoding the picture mark in the image, and wherein the data is valid for the limited time; and
   communicating the data to the user device.

2. The method of claim 1, wherein the data comprises a web browser link for a browser application of the user device, a mobile application executable by the user device, a media file, text data, messaging data, and a purchase option for the item in a transaction processing application of the user device.

3. The method of claim 1, wherein a merchant selling the item generates the picture mark for display on the item.

4. The method of claim 1, wherein the picture mark corresponds to a visual marking associated with the item.

5. The method of claim 4, wherein the visual marking comprises one of a label of the item, a logo for a brand or the item, and an icon for the brand or the item.

6. The method of claim 1, wherein the determining the location comprises receiving a location of the user device using a GPS locator of the user device.

7. The method of claim 1, wherein the determining the data associated with the item from the picture mark and the location comprises matching the picture mark displayed in the image to registered picture marks in a database and matching the location to picture mark location data for the registered picture marks in the database.

8. The method of claim 1, further comprising:
in response to the communicating the data to the user device, receiving a transaction processing request for the item from a merchant associated with the location; and
processing the transaction processing request to provide a payment to the merchant from the user.

9. The method of claim 8, further comprising:
receiving a request to register the picture mark, wherein the request comprises the data for the item; and
associating the picture mark with the data in a database.

10. A method comprising:
receiving an image captured by a user device using a camera of the user device, wherein the image includes a picture mark associated with an item, wherein a general picture mark corresponds to a plurality of items including the item, and wherein the picture mark for the item is generated specifically for the item for a limited time by modifying the general picture mark;
determining, from the image, data associated with the picture mark, wherein the determining the data is performed without decoding the picture mark in the image, and wherein the data is valid for the limited time; and
communicating the data to the user device.

11. The method of claim 10, wherein the data comprises a website link for a website, and wherein the website comprises information associated with an item having the picture mark affixed to the item.

12. The method of claim 11, wherein the website provides a checkout webpage for purchase of the item.

13. The method of claim 12, wherein the website further comprises at least one incentive available for the item.

14. A system comprising:
a non-transitory memory;
one or more hardware processors coupled to the non-transitory memory and configured to execute instructions from the non-transitory memory to cause the system to perform operations comprising:
receiving an image captured by a user device using a camera of the user device, wherein the image includes a picture mark displayed on an item, wherein a general picture mark corresponds to a plurality of items including the item, and wherein the picture mark for the item is generated specifically for the item for a limited time by modifying the general picture mark;
determining a location of the user using the user device;
determining data associated with the item from the picture mark and the location, wherein the determining the data is performed without decoding image data in the image, and wherein the data is valid for the limited time; and
communicating the data to the user device.

15. The system of claim 14, wherein the location of the user is determined using a GPS locator of the user device.

16. The system of claim 14, wherein the picture mark corresponds to a plurality of items, and wherein the data corresponds to the plurality of items.

\* \* \* \* \*